United States Patent
Elron et al.

(10) Patent No.: US 10,585,763 B2
(45) Date of Patent: *Mar. 10, 2020

(54) REBUILD ROLLBACK SUPPORT IN DISTRIBUTED SDS SYSTEMS

(71) Applicant: INTERNATIONAL BUSINESS MACHINES CORPORATION, Armonk, NY (US)

(72) Inventors: Ram Elron, Haifa (IL); Michael Keller, Haifa (IL); Rivka M. Matosevich, Zichron-Ya'acov (IL); Osnat Shasha, Holon (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/995,397

(22) Filed: Jun. 1, 2018

(65) Prior Publication Data

US 2018/0276087 A1    Sep. 27, 2018

Related U.S. Application Data

(63) Continuation of application No. 15/277,271, filed on Sep. 27, 2016, now Pat. No. 10,007,582.

(51) Int. Cl.
*G06F 11/14*    (2006.01)
*G06F 3/06*    (2006.01)
(Continued)

(52) U.S. Cl.
CPC .......... *G06F 11/1471* (2013.01); *G06F 3/065* (2013.01); *G06F 3/067* (2013.01);
(Continued)

(58) Field of Classification Search
CPC ............. G06F 11/2097; G06F 11/2038; G06F 11/2046; G06F 11/1471
See application file for complete search history.

(56) References Cited

U.S. PATENT DOCUMENTS 7,831,550 B1    11/2010    Pande et al.
8,375,181 B1    2/2013    Kekre et al.
(Continued)

*Primary Examiner* — Jigar P Patel
(74) *Attorney, Agent, or Firm* — Griffiths & Seaton PLLC

(57) ABSTRACT

Methods, computing systems and computer program products implement embodiments of the present invention that include detecting a loss of communication with a given storage node among multiple storage nodes in a distributed computing system. Upon detecting the loss of communication, a log including updates to the data stored in the given storage node is recorded and, the recorded updates can be applied to the given storage node upon communication with the given storage node being reestablished. In some embodiments, the distributed storage system may be configured as a software defined storage system where the storage nodes can be implemented as either virtual machines or software containers. In additional embodiments, upon detecting the loss of communication, a redistribution of the mirrored data among remaining storage nodes is initiated upon detecting the loss of communication, and the redistribution is rolled back upon reestablishing the communication.

14 Claims, 4 Drawing Sheets

(51) Int. Cl.
  *G06F 11/16* (2006.01)
  *G06F 11/10* (2006.01)
  *G06F 11/20* (2006.01)

(52) U.S. Cl.
  CPC .......... *G06F 3/0619* (2013.01); *G06F 3/0653* (2013.01); *G06F 11/1076* (2013.01); *G06F 11/1662* (2013.01); *G06F 11/2058* (2013.01); *G06F 11/2082* (2013.01); *G06F 2201/805* (2013.01); *G06F 2201/81* (2013.01); *G06F 2201/875* (2013.01)

(56) References Cited

U.S. PATENT DOCUMENTS

| | | | |
|---|---|---|---|
| 8,589,915 B2 | 11/2013 | Wookey | |
| 9,128,880 B2 | 9/2015 | Benson et al. | |
| 2003/0231529 A1* | 12/2003 | Hetrick | G06F 11/1092 365/200 |
| 2005/0120242 A1* | 6/2005 | Mayer | G06F 21/55 726/4 |
| 2008/0126853 A1* | 5/2008 | Callaway | G06F 11/1641 714/13 |
| 2012/0051228 A1* | 3/2012 | Shuman | H04L 41/0677 370/242 |
| 2014/0164327 A1 | 6/2014 | Ngo et al. | |
| 2015/0227606 A1* | 8/2015 | Barton | H04L 67/1095 707/622 |
| 2016/0328226 A1* | 11/2016 | Arya | G06F 8/63 |
| 2017/0031671 A1 | 2/2017 | Joshi et al. | |

\* cited by examiner

REBUILD ROLLBACK SUPPORT IN DISTRIBUTED SDS SYSTEMS

CROSS-REFERENCE TO RELATED APPLICATIONS

This Application is a Continuation of U.S. patent application Ser. No. 15/277,271, filed on Sep. 27, 2016, the contents of which incorporated herein by reference.

FIELD OF THE INVENTION

The present invention relates generally to storage systems, and specifically to implement rebuild rollback support in distributed storage systems such as software defined storage systems.

BACKGROUND

In software-defined computing (SDC), a computing infrastructure is virtualized and delivered as a service. For example, in a software-defined storage (SDS) system storage hardware is separated from software that manages the storage infrastructure. In SDS, the software managing a software-defined storage environment may also provide policy management for features such as deduplication, replication, thin provisioning, snapshots and backup. By definition, SDS software is separate from the hardware it is managing, and can be implemented via appliances over a traditional Storage Area Network (SAN), or implemented as part of a scaled-out Network-Attached Storage (NAS) solution, or as the basis of an Object-based storage solution.

Implementing an SDS system enables enterprises to use their own server and disk infrastructure for assembling, setting up, and executing one or more enterprise-class storage systems. The SDS systems can incorporate vendor specific storage technology that is typically supplied as a virtual appliance, often referred to as a distributed virtual storage system.

The description above is presented as a general overview of related art in this field and should not be construed as an admission that any of the information it contains constitutes prior art against the present patent application.

SUMMARY

There is provided, in accordance with an embodiment of the present invention, a method including (a) detecting, by a distributed storage system, a loss of communication with a given storage node among multiple storage nodes; (b) recording a log comprising updates to the data stored in the given storage node; (c) applying, by the distributed storage system, the recorded updates to the given storage node upon reestablishing communication with the given storage node; (d) upon detecting the loss of communication, initiating redistribution of the mirrored data among remaining storage nodes, and rolling back the redistribution upon reestablishing communication with the given storage node; and (e) halting recording of the log upon the redistribution reaching a specified threshold, and completing the redistribution of the mirrored data among the remaining storage nodes; wherein a management application assesses whether rolling back the redistribution and applying the recorded updates will require more resources than continuing the redistribution of the mirrored data to the remaining storage nodes by referencing the specified threshold, and the redistribution of the mirrored data among the remaining storage nodes is completed upon determining, by the management application, the specified threshold has been reached.

BRIEF DESCRIPTION OF THE DRAWINGS

The disclosure is herein described, by way of example only, with reference to the accompanying drawings, wherein.

DETAILED DESCRIPTION OF EMBODIMENTS

Distributed storage systems comprise multiple storage nodes that can distribute and mirror data using a redundant array of inexpensive disks (RAID) configuration in order to provide data redundancy, performance improvement, or both. In a distributed software defined storage (SDS) system, the storage nodes may also be referred to as SDS nodes.

Storage systems such as SDS systems typically use a backend channel (also called an interconnect channel) for communication between storage nodes during the rebuild process. This communications channel may experience temporary network impairments, which can result in a given storage node being disconnected from the storage system for a short time period. If the given storage node stores mirrored data, then the storage system needs to immediately start rebuilding the mirrored data on remaining storage nodes in the SDS system, since any additional failure in the SDS system may result in permanent data loss.

Embodiments of the present invention provide methods and systems for implementing rebuild rollback support in distributed storage systems such as SDS systems. As described hereinbelow, a distributed storage system comprising multiple storage nodes is configured to mirror data among the storage nodes. If the distributed storage system detects a loss of communication with a given storage node, a log comprising updates to the data stored in the given storage node subsequent to detecting the loss of communication is recorded, and upon reestablishing communication with the given storage node, the recorded updates are applied to the given storage node. Since creating the log and updating the given storage node with the changes stored in the log typically requires fewer input/output (I/O) operations than redistributing the mirrored data among remaining storage nodes, systems implementing embodiments of the present invention can reduce the time and system resources needed to recover from communications failures.

Figure 1:
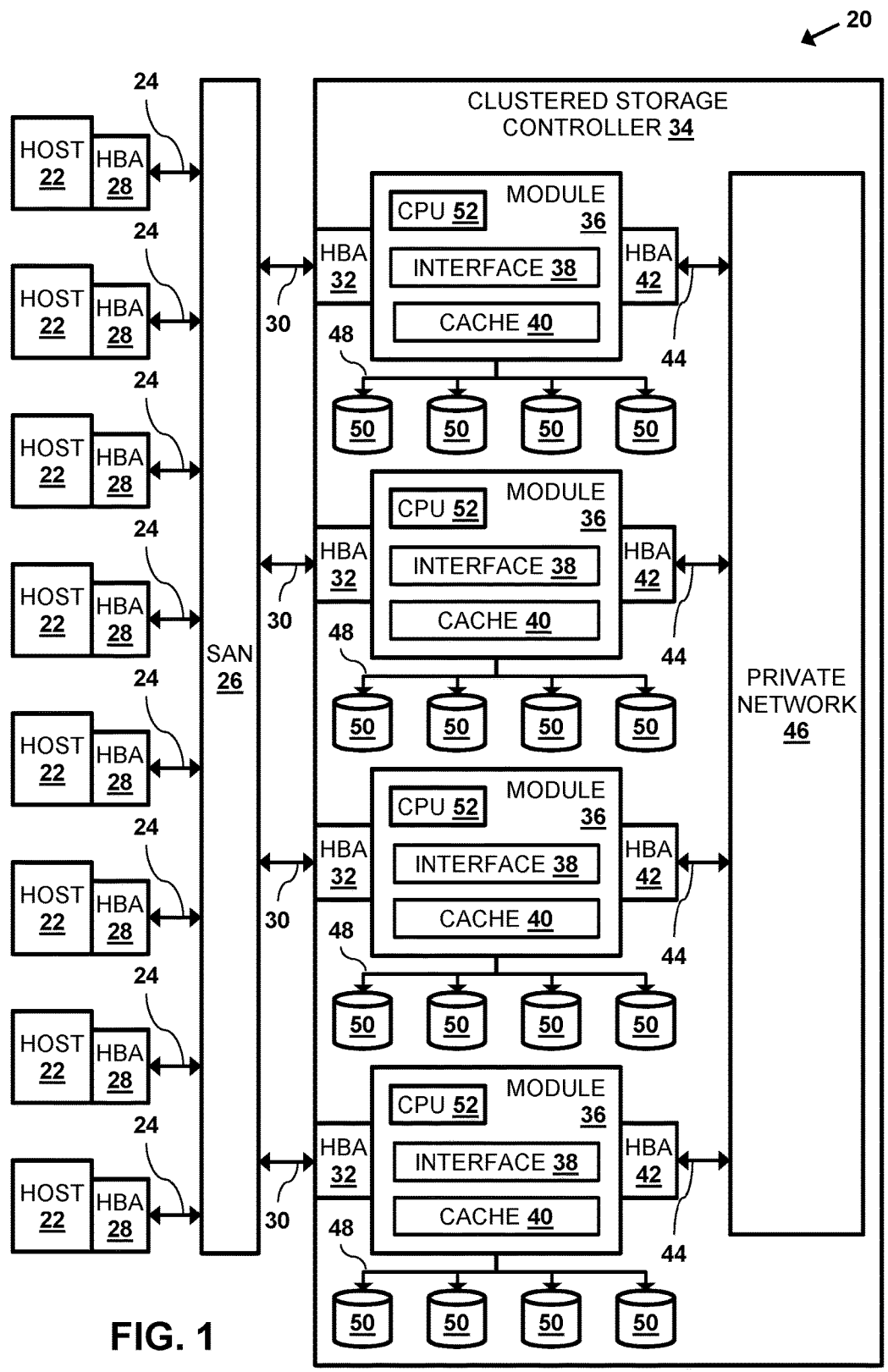
FIG. 1 is a block diagram that schematically illustrates a storage system comprising a storage controller having multiple modules, in accordance with an embodiment of the present invention.

FIG. 1 is a block diagram that schematically illustrates a data processing storage subsystem 20, in accordance with an embodiment of the invention. The particular subsystem (also referred to herein as a storage system) shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on logical volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a logical volume. Storage subsystem 20 may operate in, or as, a SAN system.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host bus adapters (HBAs). Clustered storage controller 34 implements clusters of storage modules 36, each of which includes a processor 52, an interface 40 (in communication between adapters 32 and 42), and a cache 38. Each storage module 36 is responsible for a number of storage devices 50 by way of a data connection 48 as shown.

As described previously, each storage module 36 further comprises a given cache 38. However, it will be appreciated that the number of caches 38 used in storage subsystem 20 and in conjunction with clustered storage controller 34 may be any convenient number. While all caches 38 in storage subsystem 20 may operate in substantially the same manner and comprise substantially similar elements, this is not a requirement. Each of the caches 38 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

Each set of storage devices 50 comprises multiple slow and/or fast access time mass storage devices, herein below assumed to be multiple hard disks. FIG. 1 shows caches 38 coupled to respective sets of storage devices 50. In some configurations, the sets of storage devices 50 comprise one or more hard disks, or solid state drives (SSDs) which can have different performance characteristics. In response to an I/O command, a given cache 38, by way of example, may read or write data at addressable physical locations of a given storage device 50. In the embodiment shown in FIG. 1, caches 38 are able to exercise certain control functions over storage devices 50. These control functions may alternatively be realized by hardware devices such as disk controllers (not shown), which are linked to caches 38.

Each storage module 36 is operative to monitor its state, including the states of associated caches 38, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 38 may be performed over a network and/or a switch. Herein, by way of example, HBAs 28 may be coupled to storage modules 36 by at least one switch (not shown) of SAN 26, which can be of any known type having a digital cross-connect function. Additionally or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While such hardware is not explicitly shown for purposes of illustrative simplicity, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Storage devices 50 may comprise a combination of high capacity hard disk drives and solid state disk drives. In some embodiments each of storage devices 50 may comprise a logical storage device. In storage systems implementing the Small Computer System Interface (SCSI) protocol, the logical storage devices may be referred to as logical units, or LUNs. While each LUN can be addressed as a single logical unit, the LUN may comprise a combination of high capacity hard disk drives and/or solid state disk drives.

While the configuration in FIG. 1 shows storage controller 34 comprising four modules 36 and each of the modules coupled to four storage devices 50, a given storage controller 34 comprising any multiple of modules 36 coupled to any plurality of storage devices 50 is considered to be with the spirit and scope of the present invention.

Figure 2:
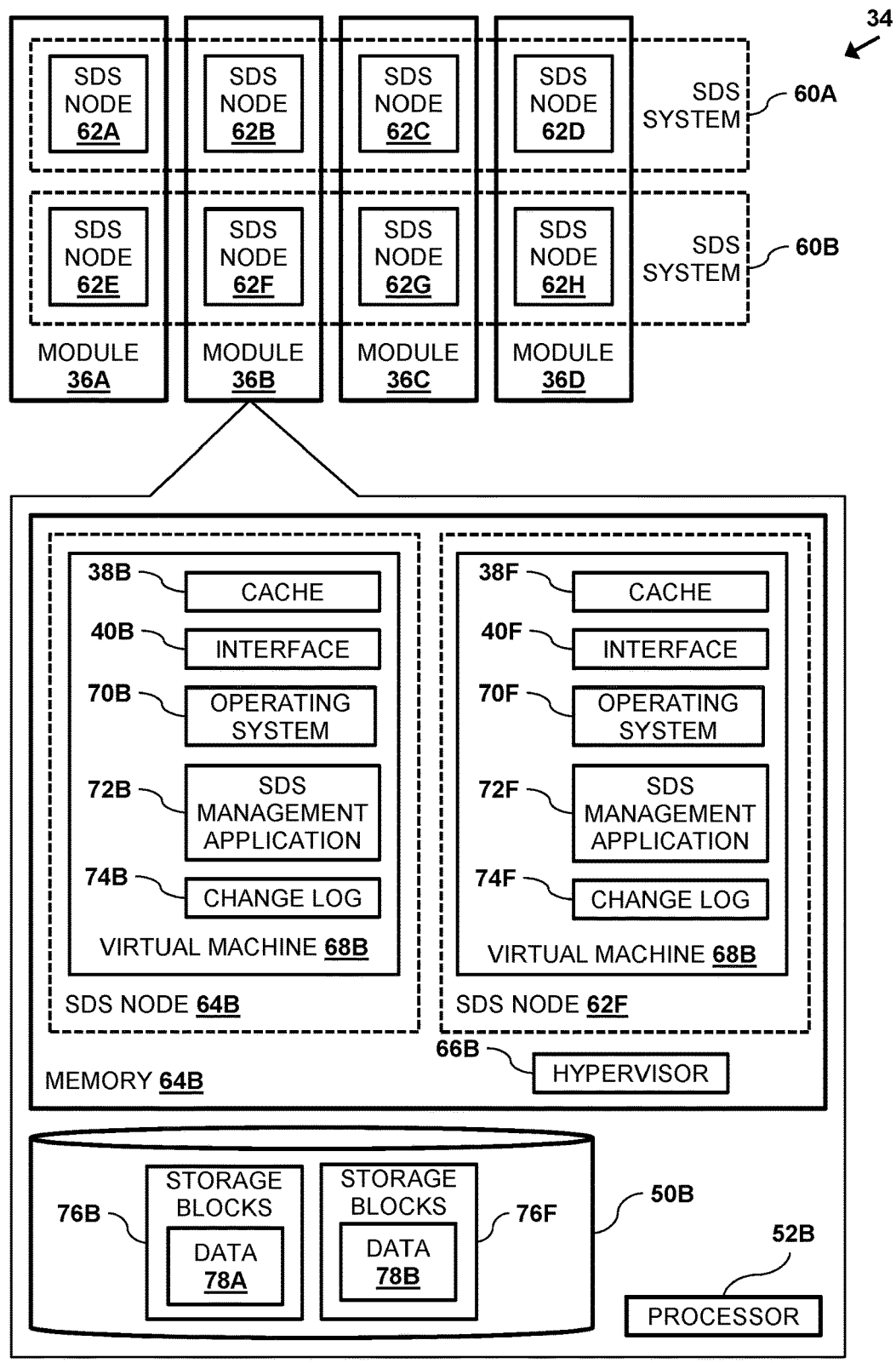
FIG. 2 is a block diagram that schematically illustrates software defined storage (SDS) systems comprising multiple SDS nodes that are distributed across the modules of the storage system.

FIG. 2 is a block diagram that schematically illustrates configuration of software defined storage (SDS) systems 60 comprising SDS nodes (also referred to herein as storage nodes) 62 that are distributed across modules 36, in accordance with an embodiment of the present invention. While FIG. 2 shows each of SDS system 60 comprising four SDS nodes 62 distributed across four modules 36 of a single storage controller 34, SDS systems 60 comprising any number (e.g., more than four in configurations where storage controller 34 comprises more than four modules 36) of SDS nodes 62 distributed across any number of storage controllers 34 are considered to be within the spirit and scope of the present invention.

In embodiments described herein, modules 36, SDS systems 60, SDS nodes 62 and their respective hardware and software components are differentiated by appending a letter to the identifying numeral, so that the modules comprise modules 36A-36D, the SDS systems comprise SDS systems 60A and 60B, and the SDS nodes comprise SDS nodes 62A-62H. SDS 60 comprises SDS node 62A stored on module 36A, SDS node 62B stored on module 36B, SDS node 62C stored on module 36C, and SDS node 62D stored on module 36D. SDS 60 comprises SDS node 62E stored on module 36A, SDS node 62F stored on module 36B, SDS node 62G stored on module 36C, and SDS node 62H stored on module 36D.

In addition to processor 52, each module 36 comprises a memory 64. Examples of memory 64 include dynamic random-access memory (DRAM) and non-volatile random-access memory (NVRAM). In operation, processor 52 executes, from memory 64, a hypervisor 66 that manages virtual machines 68. Each virtual machine 68 comprises cache 38, interface 40, and operating system 70, an SDS management application 72, and a change log 74. SDS management application 72 comprises a distributed software application that configures multiple virtual machines 68 in modules 36 to operate as an SDS system. As described hereinbelow, upon losing communication with a given SDS node 62, SDS management application 72 records updates for the given SDS node to change logs 74.

Each storage device 50 comprises a plurality of storage blocks 76 (also known as data blocks and partitions) on the storage system that store data 78 for SDS systems 60. In the example shown in FIG. 2, SDS management application 72 distributes storage blocks 76 among SDS nodes 62 so that data 78A for SDS system 60A is stored in storage blocks 76A-76D, and data 78B for SDS system 60B is stored in storage blocks 76E-76H.

In some embodiments, SDS systems 60 can distribute data using redundant array of inexpensive disks (RAID) configuration such as RAID 10 that use data striping. In data striping, logically sequential data (e.g., a file) is segmented so that consecutive segments are stored on different physical storage devices. RAID 10 comprises a "stripe of mirrors" that requires at least four storage devices 50. As described in the description referencing FIG. 4 hereinbelow, a given SDS system 60 can implement an alternative RAID 10 configuration that distributes uses a data parallelism approach that distributed the mirrored data among all the SDS nodes in the given SDS system 60.

While the example in FIG. 2 shows each SDS node 62 executing within a given virtual machine 68, other configurations are considered to be within the spirit and scope of the present invention. For example, the SDS nodes executing on a given module 36 may be deployed in respective software containers share a single instance of the operating system executing on the given module.

Processors 52 comprise general-purpose central processing units (CPU) or special-purpose embedded processors, which are programmed in software or firmware to carry out the functions described herein. The software may be downloaded to modules 36 in electronic form, over a network, for example, or it may be provided on non-transitory tangible media, such as optical, magnetic or electronic memory media. Alternatively, some or all of the functions of processors 52 may be carried out by dedicated or programmable digital hardware components, or using a combination of hardware and software elements.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

SDS Node Failure Recovery

Figure 3:
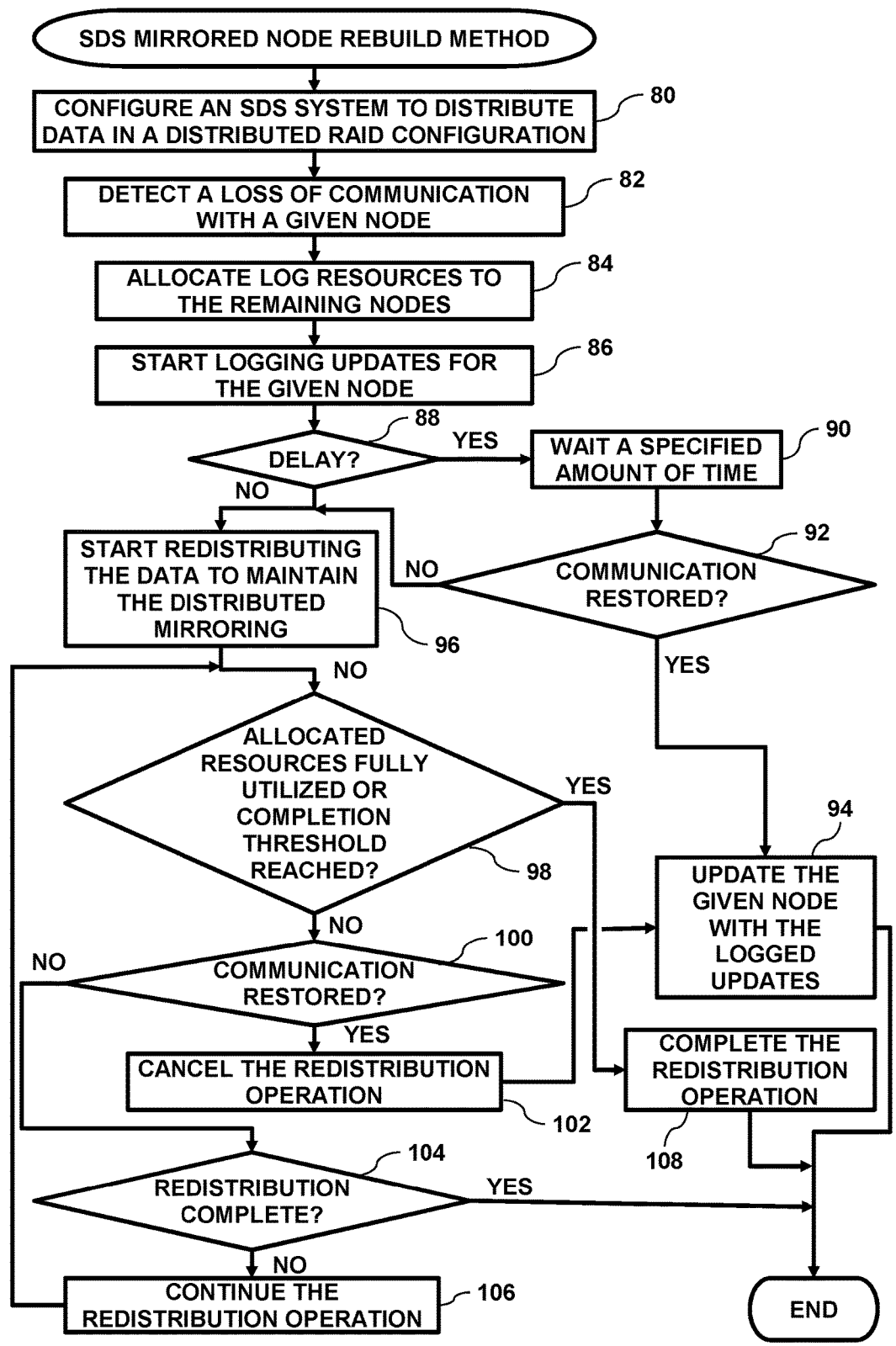
FIG. 3 is a flow diagram that schematically illustrates a method of rebuilding data of a failed SDS node in a given SDS system, in accordance with an embodiment of the preset invention.
Figure 4:
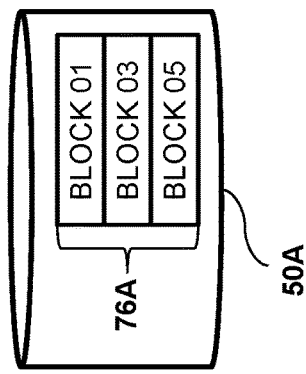
FIG. 4 is a block diagram that schematically illustrates an initial storage unit distribution among the SDS nodes, in accordance with an embodiment of the present invention.
Figure 4:
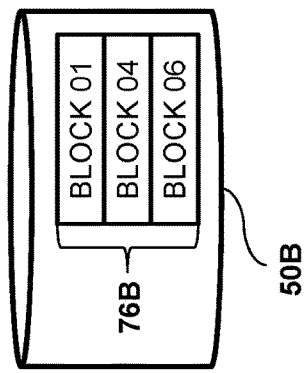
Figure 4:
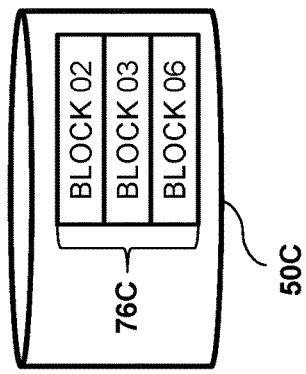
Figure 4:
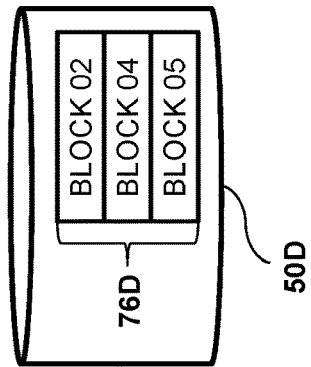

FIG. 3 is a flow diagram that schematically illustrates a method of rebuilding data from a given SDS node 62 that has failed (i.e., a communications failure as described hereinbelow) in a given SDS system 60, and FIG. 4 is a block diagram that schematically illustrates an initial distribution of storage units 76 in SDS system 60A, in accordance with an embodiment of the preset invention. In the example shown in FIG. 4, SDS system 60A implements a distributed mirroring configuration so that the first storage block (i.e., "BLOCK 01" in the Figure) 76 is mirrored between SDS nodes 62A and 62B, the second storage block 76 is mirrored between SDS nodes 62C and 62D, the third storage block 76 is mirrored between SDS nodes 62A and 62C, the fourth storage block 76 is mirrored between SDS nodes 62B and 62D, the fifth storage block 76 is mirrored between SDS nodes 62A and 62D, and the sixth SDS node is mirrored between SDS nodes 62B and 62C.

In a configuration step 80, SDS management application 72 configures SDS system 60A to distribute data 78A among SDS nodes 62A-62D, and in a detection step 82, the SDS management application detects a communications failure with SDS node 62C. In an allocation step 84, SDS management application 72 allocates resources (e.g., in memories 64A, 64B and 64D) to change logs 74, and in a logging step 86, the SDS management application 72 starts storing (i.e., recording) any changes (i.e., updates) to data 78A that was stored and managed by SDS node 62C to change logs 114 in SDS nodes 62A, 62B and 62D. In the example shown in FIG. 4, change log 74A stores any changes to the third storage block 76, change log 74B stores any changes to the sixth storage block 76, and change log 74D stores any changes to the second storage block 76.

While the configuration in FIG. 2 shows change logs 74 stored in a given virtual machine 68 in a given memory 64, storing the change log to a given storage device 50 is considered to be within the spirit and scope of the present invention. In some embodiments, SDS management application 72 can allocate, to change logs 74, specific respective amounts of storage resources in memories 64 and/or on storage devices 50A.

In some embodiments, upon detecting a loss of communication with a given SDS node 62, SDS management application 72 may want to wait (i.e., delay rebuilding the SDS system by redistributing the data in storage units 76 among the remaining active SDS nodes) a specific amount of time to see if the SDS management application can reestablish communication with the given SDS node. In a first comparison step 88, if a delay is indicated, then in a delay step 90, SDS management application 72 waits for a specified amount of time. While waiting the specified amount of time, SDS management application 72 continues to update change logs 76. In a second comparison step 92, if SDS management application 72 detects that communication has been restored with SDS node 62C, then in an update step 94, the SDS management application updates SDS node 62C with data 78 stored in change logs 74A, 74B and 74D, and the method ends.

If SDS management application 72 does not detect that communication has been restored with SDS node 62C or if no delay is indicated in step 88, then in a redistribution step 96, the SDS management application starts rebuilding SDS system 60A by redistributing storage units 76 so that the data is distributed and mirrored among SDS nodes 62A, 62B and 62D. While updated change logs 76 and redistributing storage units 76, SDS management application 72 determines a completion threshold completion threshold that dynamically assesses if updating SDS node 62C with data 78 in change logs 74 will require more time and/or resources than completing redistributing the storage units among SDS nodes 62A, 62B and 62D.

In a third comparison step 98, if the allocated resources are not fully utilized and if the completion threshold has not been reached, then in a fourth comparison step 100, SDS management application 72 checks if communication is restored with SDS node 62C. If SDS management application 72 reestablishes (i.e., restores) communication with SDS node 62C, then in a cancellation step 102, the SDS management application cancels the data redistribution operation, rolls back any data distribution that has already been carried out, and the method continues with step 94.

Returning to step 100, if SDS management application 72 has not reestablished communication with SDS node 62C, then in a fifth comparison step 104, if the SDS management application has not completed the redistribution operation (i.e., redistributing storage units 76 among SDS nodes 62A, 62B and 62D), then the SDS management application continues redistributing the data in a continuation step 106, and the method continues with step 98. Returning to step 104, the method ends the when the data redistribution operation is complete. Upon completing the data redistribution operation, SDS management application 72 deletes the data stored in change logs 74A, 74B and 74D, and reconfigures SDS system 60A to comprise SDS nodes 62A, 62B and 62D.

Figure 5:
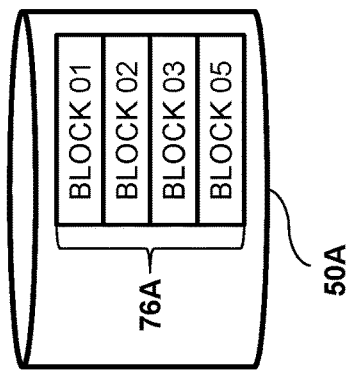
FIG. 5 is a block diagram that schematically illustrates a redistribution of the storage units among the SDS nodes following a loss of communication with a given SDS node, in accordance with an embodiment of the present invention.
Figure 5:
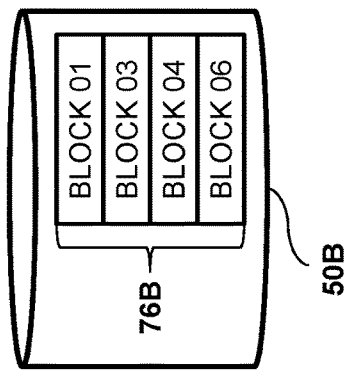
Figure 5:
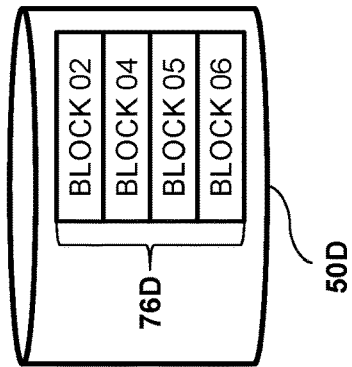

FIG. 5 is a block diagram that schematically illustrates the redistribution of storage units 76 among SDS nodes 62A, 62B and 62D, in accordance with an embodiment of the present invention. In the example shown in FIG. 5, the first storage block 76 is mirrored between SDS nodes 62A and 62B, the second storage block 76 is mirrored between SDS nodes 62B and 62D, the third storage block 76 is mirrored between SDS nodes 62A and 62B, the fourth storage block 76 is mirrored between SDS nodes 62B and 62D, the fifth storage block 76 is mirrored between SDS nodes 62A and 62D, and the sixth SDS node is mirrored between SDS nodes 62B and 62D.

Returning to step 98, if the allocated resources are fully utilized or if the completion threshold is reached, then in a completion step 108, SDS management application 72 deletes the data stored in change logs 74A, 74B and 74D, completes the data redistribution operation, and the method ends. In some embodiments, if SDS management application 72 detects a loss of communication an additional given SDS node 62 while performing step 102 or 94, the SDS management application can use embodiments described in the flow diagram to define additional change logs 74, record additional changes to data 78 stored by the second given SDS node, and update the second given SDS node with the additional recorded changes upon reestablishing communication with the second given SDS node.

The flowchart(s) and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for rebuild rollback support in a storage environment, by a processor device, comprising:
   detecting, by a distributed storage system, a loss of communication with a given storage node among multiple storage nodes;
   recording a log comprising updates to the data stored in the given storage node;
   applying, by the distributed storage system, the recorded updates to the given storage node upon reestablishing communication with the given storage node;
   upon detecting the loss of communication, initiating redistribution of the mirrored data among remaining storage nodes, and rolling back the redistribution upon reestablishing communication with the given storage node; and
   halting recording of the log upon the redistribution reaching a specified threshold, and completing the redistribution of the mirrored data among the remaining storage nodes; wherein a management application assesses whether rolling back the redistribution and applying the recorded updates will require more resources than continuing the redistribution of the mirrored data to the remaining storage nodes by referencing the specified threshold, and the redistribution of the mirrored data among the remaining storage nodes is completed upon determining, by the management application, the specified threshold has been reached.

2. The method according to claim 1, wherein the storage system comprises a software-defined storage system, and wherein each of the storage nodes is selected from a group consisting of a virtual machine and a software container.

3. The method according to claim 1, wherein each of the storage nodes comprises a set of storage blocks configured to store the data, and wherein mirroring the data on a given storage node comprises distributing mirrored copies of the storage blocks to remaining storage nodes.

4. The method according to claim 1, wherein the log comprises a specified set of resources, and further comprising halting recording of the log upon the log fully utilizing the specified set of resources, and completing the redistribution of the mirrored of the data among the remaining storage nodes.

5. The method according to claim 1, wherein the given storage node comprises a first given storage node, wherein the log comprises a first log, wherein the updates comprise first updates, and further comprising while applying the first updates to the first given storage node, detecting, by the distributed storage system, a loss of communication with a second given storage node, recording a second log comprising second updates to the data stored in the second given storage node, and applying, by the distributed storage system, the recorded second updates to the second given storage node upon reestablishing communication with the second given storage node.

6. A distributed storage system implementing rebuild rollback support, comprising multiple storage nodes, the storage nodes configured:
   to detect a loss of communication with a given storage node among the multiple storage nodes,
   to record a log comprising updates to the data stored in the given storage node,
   to apply the recorded updates to the given storage node upon reestablishing communication with the given storage node,
   upon detecting the loss of communication, to initiate redistribution of the mirrored data among remaining storage nodes, and to roll back the redistribution upon reestablishing communication with the given storage node; and
   to halt recording of the log upon the redistribution reaching a specified threshold, and to complete the redistribution of the mirrored data among the remaining storage nodes; wherein a management application assesses whether rolling back the redistribution and applying the recorded updates will require more resources than continuing the redistribution of the mirrored data to the remaining storage nodes by referencing the specified threshold, and the redistribution of the mirrored data among the remaining storage nodes is completed upon determining, by the management application, the specified threshold has been reached.

7. The distributed storage system according to claim 6, wherein the storage nodes comprise a software-defined storage system, and wherein each of the storage nodes is selected from a group consisting of a virtual machine and a software container.

8. The distributed storage system according to claim 6, wherein each of the storage nodes comprises a set of storage blocks configured to store the data, and wherein the distributed storage system is configured to mirror the data on a given storage node by distributing mirrored copies of the storage blocks to remaining storage nodes.

9. The distributed storage system according to claim 6, wherein the log comprises a specified set of resources, and wherein the distributed storage system is further configured to halt recording of the log upon the log fully utilizing the specified set of resources, and to complete the redistribution of the data mirrored among the remaining storage nodes.

10. The distributed storage system according to claim 6, wherein the given storage node comprises a first given storage node, wherein the log comprises a first log, wherein the updates comprise first updates, and while applying the first updates to the first given storage node, the distributed storage system is further configured to detect a loss of communication with a second given storage node, to record a second log second comprising second updates to the data stored in the second given storage node, and to apply the recorded second updates to the second given storage node upon reestablishing communication with the second given storage node.

11. A computer program product for rebuild rollback support in a storage environment, by a processor device, the computer program product comprising:

a non-transitory computer readable storage medium having computer readable program code embodied therewith, the computer readable program code comprising:

computer readable program code configured to detect, by a distributed storage system, a loss of communication with a given storage node among multiple storage nodes;

computer readable program code configured to record a log comprising updates to the data stored in the given storage node;

computer readable program code configured to apply, by the distributed storage system, the recorded updates to the given storage node upon reestablishing communication with the given storage node;

computer readable program code configured, upon detecting the loss of communication, to initiate redistribution of the mirrored data among remaining storage nodes, and to roll back the redistribution upon reestablishing communication with the given storage node; and computer readable program code configured to halt recording of the log upon the redistribution reaching a specified threshold, and to complete the redistribution of the mirrored data among the remaining storage nodes; wherein a management application assesses whether rolling back the redistribution and applying the recorded updates will require more resources than continuing the redistribution of the mirrored data to the remaining storage nodes by referencing the specified threshold, and the redistribution of the mirrored data among the remaining storage nodes is completed upon determining, by the management application, the specified threshold has been reached.

12. The computer program product according to claim 11, wherein the storage nodes comprise a software-defined storage system, and wherein each of the storage nodes is selected from a group consisting of a virtual machine and a software container.

13. The computer program product according to claim 11, wherein each of the storage nodes comprises a set of storage blocks configured to store the data, and wherein the computer readable program code is configured to mirror the data on a given storage node by distributing mirrored copies of the storage blocks to remaining storage nodes.

14. The computer program product according to claim 11, wherein the log comprises a specified set of resources, and wherein the computer readable program code is further configured to halt recording of the log upon the log fully utilizing the specified set of resources, and to complete the redistribution of the mirrored data among the remaining storage nodes.

* * * * *